United States Patent [19]
Wen

[11] Patent Number: 5,590,894
[45] Date of Patent: Jan. 7, 1997

[54] BICYCLE DRIVE DEVICE

[76] Inventor: Cheng-Tsu Wen, 2nd Fl., No. 140, Sec. 2, Hsingjen Rd., Chungli City, Taoyuan, Taiwan

[21] Appl. No.: 179,386

[22] Filed: Jan. 10, 1994

[51] Int. Cl.$^6$ .................................................. B62M 1/02
[52] U.S. Cl. ........................................ 280/260; 475/283
[58] Field of Search ................................ 280/236, 237, 280/238, 260, 210, 259, 261; 475/283, 297, 298

[56] References Cited

U.S. PATENT DOCUMENTS

| | | | |
|---|---|---|---|
| 516,933 | 3/1894 | Jacoby | 290/236 |
| 4,706,982 | 11/1987 | Hartmann | 280/238 |
| 4,721,015 | 1/1988 | Hartmann | 280/236 |
| 4,735,430 | 4/1988 | Tomkinson | 280/260 |
| 4,955,627 | 9/1990 | Hartmann | 280/236 |

*Primary Examiner*—Brian L. Johnson
*Assistant Examiner*—Victor E. Johnson
*Attorney, Agent, or Firm*—Morton J. Rosenberg; David I. Klein

[57] ABSTRACT

A bicycle drive device is provided. The drive is composed of a ring gear, attached to the rear hub, and a chain wheel fixed on the axle of the rear wheel. The chain wheel is fastened on the outer surface of a unidirectional bearing so as to move in only a clockwise direction. On the inner plane of the chain wheel there are three base axles on which the planet gears are rotatively coupled. A sun gear is coupled to the inner surface of the unidirectional bearing for rotation in only a counter-clockwise direction. These gears mesh properly and form the new drive device. When the pedals are rotated clockwise to make the bicycle move forward, the planet gears would be driven counter-clockwise but are instantly locked by their meshing with the sun gear. This results in a non-interaction gear set and the bicycle would move forward without interference. As a bicycle coasts, with no pedal power input, the ring gear moves clockwise and drives the planet gears to rotate in a clockwise direction. In accordance with the sun gear's counter-clockwise rotation, the gear set does not interfere with the movement of the bicycle. When re-accelerating, the gear set locks instantly and thus transfers the pedal power instantly, at the beginning of the force-applying time period.

1 Claim, 3 Drawing Sheets

BICYCLE DRIVE DEVICE

BACKGROUND OF THE INVENTION

The new bicycle drive device is provided which is simple in structure, easy to install, convenient in use, and has a low rate of breakdown. The bicycle drive can begin acceleration without any time delay. The new drive saves human power output and is started with less force.

The utility of bicycles makes them very popular and necessary in both developed or underdeveloped countries. The drive devices of bicycles can be classified into two different kinds, that is, speed-ratio-variable and non-speed-ratio-variable. The latter have a constant ratio of the number of front chain wheel teeth to the rear's, while the former have variable ratios of the number of chain wheel teeth. Both of the two drives have their usage and market positions. However, the structures and power drive characteristics of the two types of drives are similar, that is, with one or many rear chain wheels connected to the rear wheel by a single directional rotation bearing, the human force could be transferred from the front chain wheel to the rear one via the linking chain and the rear wheel can idly rotate while no forces are applied. It is known that after a bicycle is slipping freely with no forces added, there would be a period of time which would pass before the rider could apply power to the bicycles effectively. The effect is caused by the fact that it is only when the rotational speed of the rear chain wheel is higher than that of the rear wheel's, that human power could be transferred to the rear wheel. This effect tends to be more obvious at higher speed, where there is not only a delay before acceleration regained, but also a higher expenditure of human power. To overcome the reaction caused by the slower rotate speed of the rear chain wheel compared to that of the rear wheel, more human power is required. The condition would be more severe when changing from a low speed ratio to a high speed ratio.

For the reasons listed above, it seems that there is still room for improvement in the design of bicycle drive systems.

SUMMARY OF THE INVENTION

A new bicycle drive device is provided. When force is applied to the pedals, and thereby causes the chain wheel to rotate clockwise, the three planet gears which are located on the inner surface of the chain wheel, rotate in correspondence with the ring gear, and the counter-clockwise rotating sun gear. Thus, by torquing up the gear device, the bicycle moves forward freely without any interference.

When the bicycle coasts, with no force applied, the ring gear and the rear wheel would rotate clockwise. This causes the planet gears to rotate clockwise as idlers, the planet gears meshing with the sun gear rotate counter-clockwise around the sun gear. In this way, the bicycle is able to move forward without interference.

When forces are applied to the pedals after coasting, the interaction of the planet gears' clockwise rotation provides a very rapid transfer from being driven by the ring gear to driving the ring gear. As a consequence, the applied human power can be transferred right at the beginning of the attempt to accelerate the bicycle, with no time delay nor energy waste.

When the bicycle is moving forward in a coasting condition, and then the pedals are stepped on, an immediate power transfer occurs. Such results because the ring gear is originally rotating clockwise, same as the rear wheel, and the force applied to the pedals makes the planet gears and ring gear lock in synchronism with each other. The ring gear can directly drive the planet gears (rear chain gear) when coasting, or by use of its rotating inertia, the pedal force can be aided and the force applied to the planet gears can be directly transferred to the ring gear.

An additional object of the invention is to provide an easy, simple, convenient and reliable bicycle drive device. The advantages is a bicycle with no re-start delay, no energy waste, with a savings of human power and easily driven.

DETAILED DESCRIPTION OF THE PREFERRED EMBODIMENT

Figure 1:
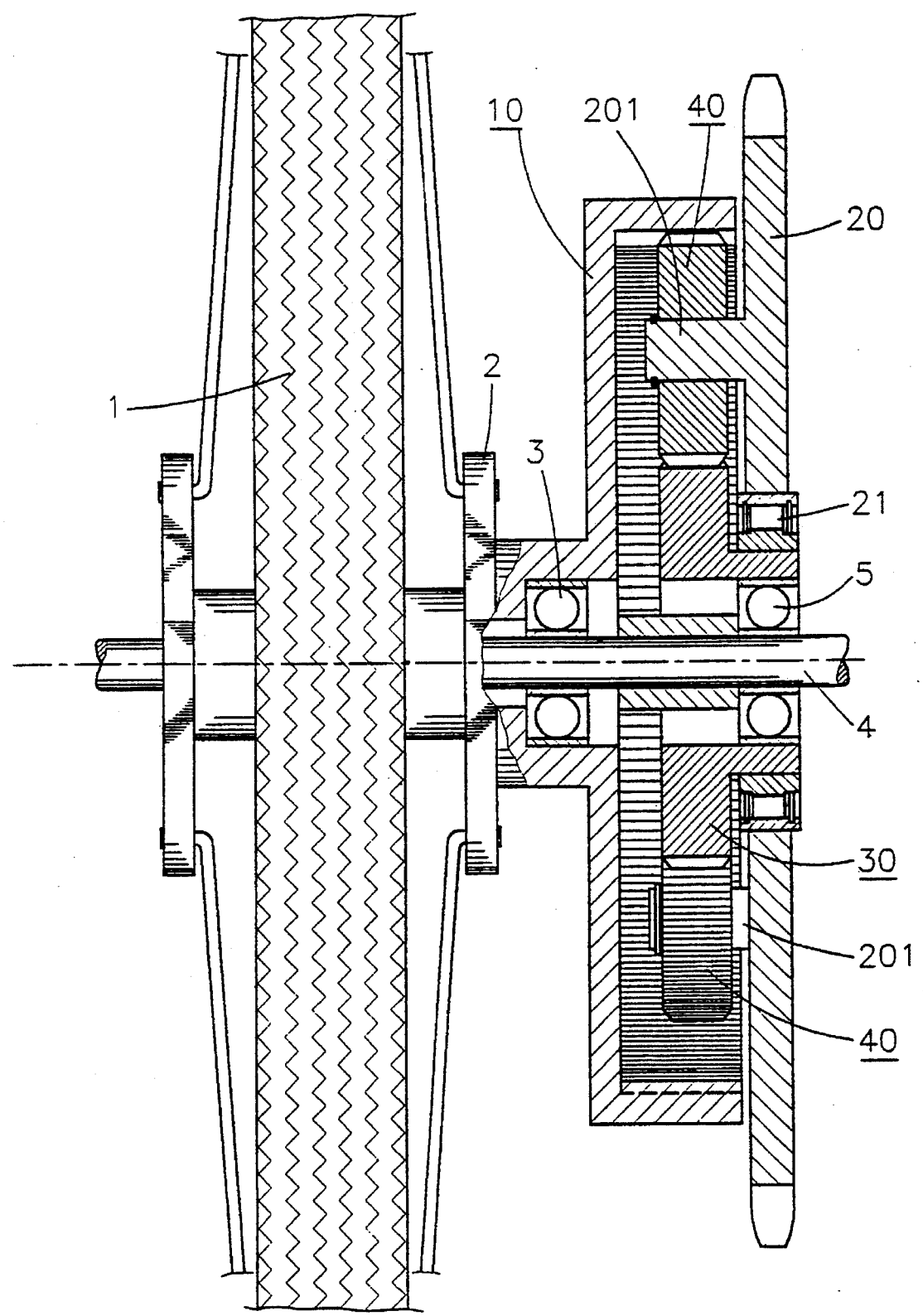
FIG. 1 is a front elevation view, partially cut away, of the planetary gear set attached to the rear hub of a bicycle wheel.
Figure 2:
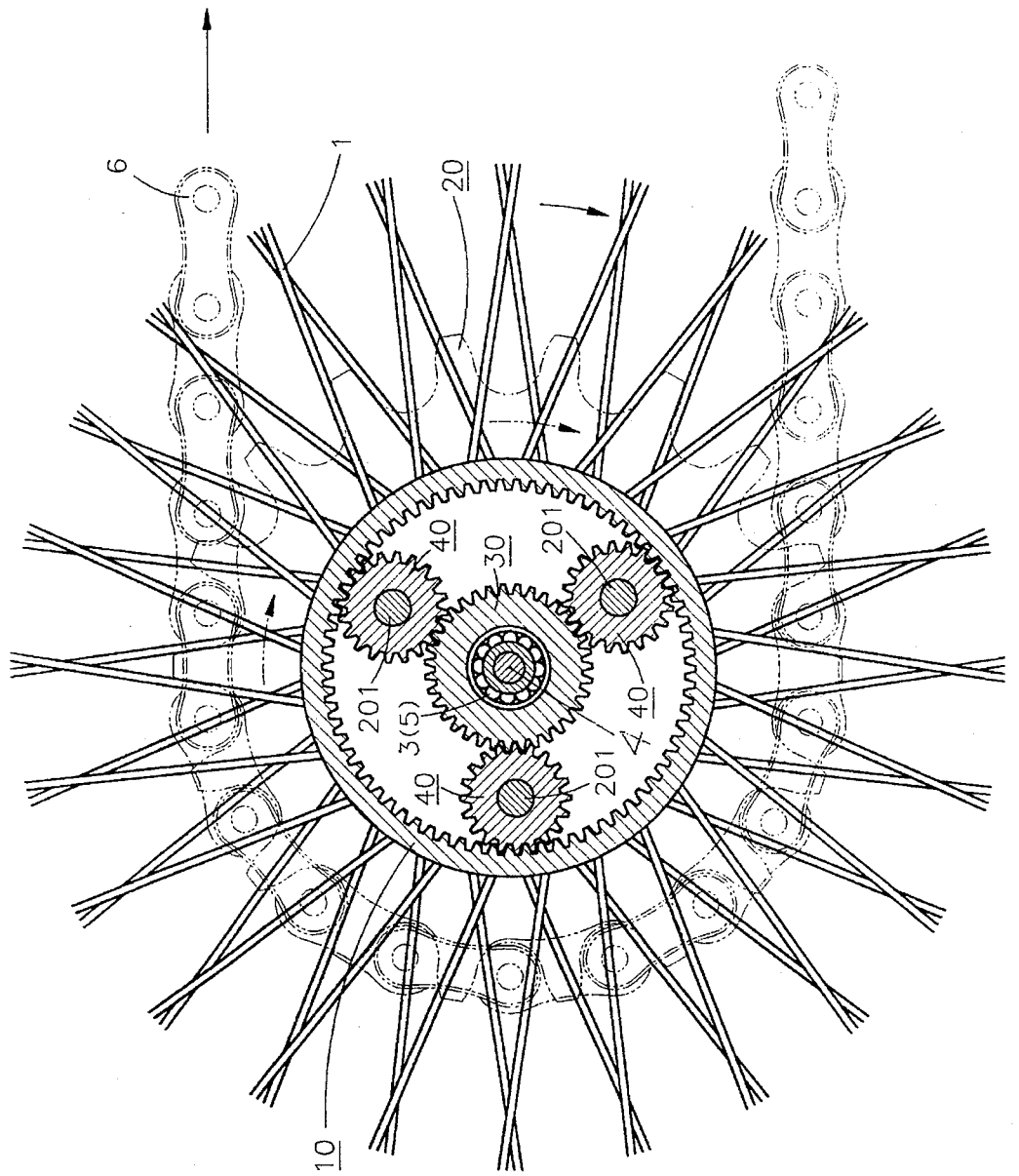
FIG. 2 is a side view, partially sectioned, of the planetary gear set.

As shown in FIGS. 1 and 2, the planetary gear set is composed of a ring gear 10 which is sized appropriately and fixed to one side of the hub 2 of the rear wheel 1. Supported by a fixed bearing 3, the ring gear is fastened to the axle 4 of the rear wheel 1. The rear chain wheel 20 is fixed to the outer side of a unidirectional bearing 21 and thus rotates only clockwise. On the inner plane of the rear chain wheel 20, there are three base axles 201 with appropriate diameters, disposed in equidistantly radial spaced relationship. The sun gear 30, which is appropriately sized, is attached to the rear chain wheel through the bearing 21 for rotation counter-clockwise, with its center fastened to the bearing 5. The bearing 5 is fixed to the axle 4 of the rear wheel 1. The three appropriate sized planet gears 40 can rotate freely and are coupled to the base axles 201 on the inner surface of the rear chain wheel 20. They can rotate with respect to the ring gear 10 and the sun gear 30, respectively.

Accordingly, when force is applied on the pedals, the clockwise motion is transferred from a front chain wheel (not shown in the Figure) to the rear chain wheel 20 via the chain 6. Since the planet gears 40 are fixed to the rear chain wheel 20 by the base axles 201 and mesh with the ring gear 10 and sun gear 30, they will thus follow the rotation of the rear chain wheel 20 and each will be driven at the same time, and follow the ring gear 10 to rotate counter-clockwise. However, the sun gear 30 is limited by the unidirectional bearing 21 so that it can only rotate counter-clockwise. Therefore, although the planet gears 40 are coupled to the power applied to rear chain wheel 20 to be rotated counter-clockwise, under the action of the sun gear 30 which can not rotate clockwise, they are each stopped and do not rotate relative to the sun gear 30. As a result, the planet gears 40 and the sun gear 30 are locked in rotation together. Naturally, the planet gears 40 do not rotate around the ring gear 10, the planet gears 40 being locked in rotation with the ring gear 10. Thus, the ring gear 10 attached to the rear hub 2 would follow the clockwise rotation of the rear chain wheel 20 and cause the rear wheel 1 to likewise rotate clockwise and move forward.

Figure 3:
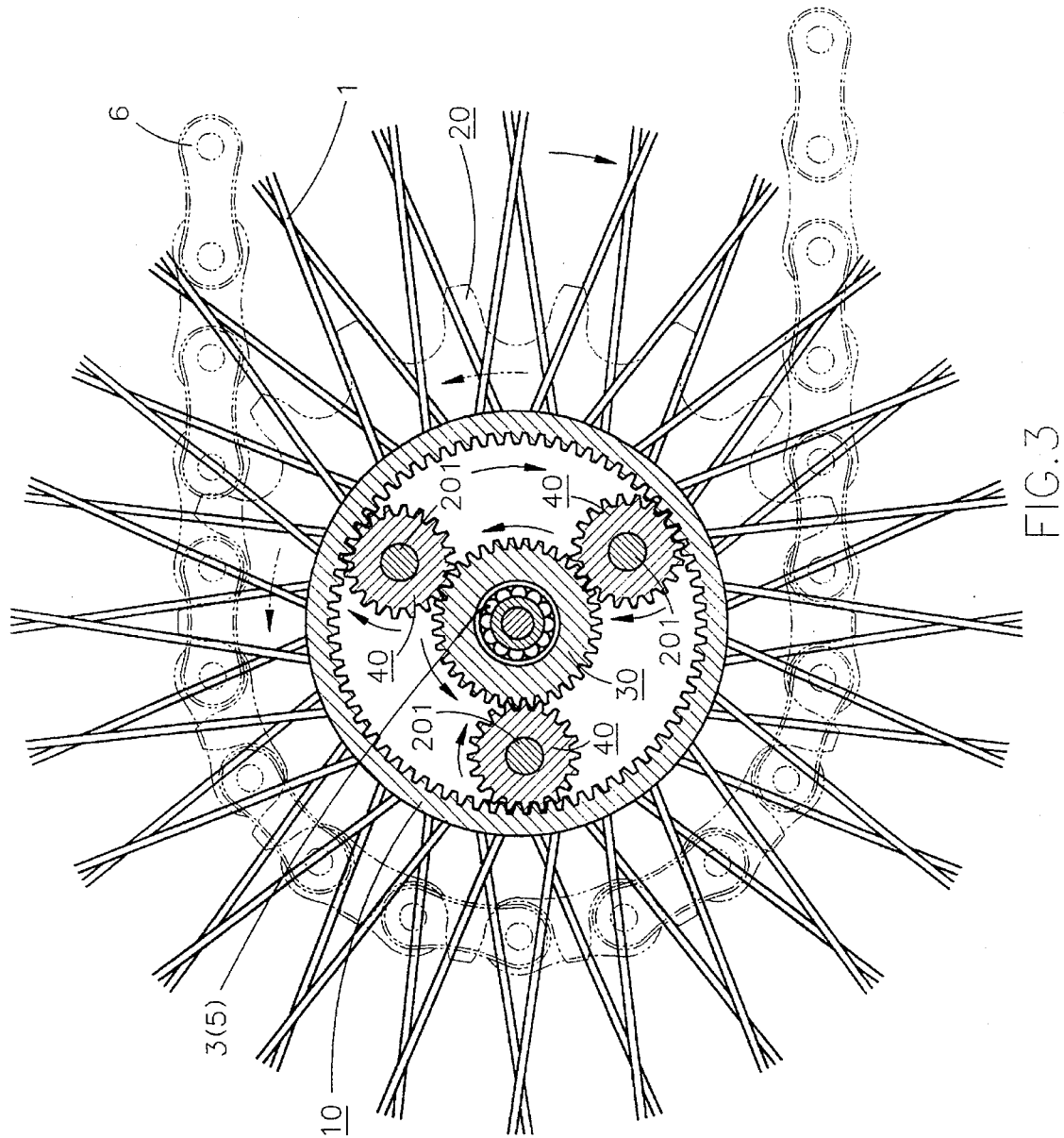
FIG. 3 is a side view, partially sectioned, showing the relative rotation of the gears of the planetary gear set.

As shown in FIG. 3, when the bicycle is coasting, without the pedals being rotated to apply power or the pedals are rotated in a reverse direction, the ring gear 10 attached to the hub 2 of the rear wheel 1, will follow the motion of the rear wheel 1. Therefore, each planet gear 40 will be driven by the clockwise rotation of the ring gear 10, each planet gear rotating clockwise around a respective base axle 201 of the rear chain wheel 20 to act as an idler. Meanwhile, with the meshing of each counter-clockwise rotating planet gear 40 with the sun gear 30, they will not be locked to each other. Therefore, the ring gear 10 and the rear wheel 1 will rotate freely and move forward. If force is applied to rotate the pedals counter-clockwise while the bicycle is coasting, the planet gears 40, secured to the rear chain wheel 20, would be driven by the counter-clockwise rotated rear chain wheel 10 to rotate with sun gear 30, still as idlers. When the pedals are rotated in a reverse direction, the chain wheel rotates counter-clockwise, the planet gears 40, positioned on each base axle 201 of rear chain wheel 20 follow the reverse rotation of the rear chain wheel 20 and rotate about the ring gear 10, each planet gear rotating clockwise. Therefore, the rotation of the ring gear 10 and the rear wheel 1 would not be interfered with.

In addition, when the pedals are rotated to accelerate the bicycle subsequent to coasting, as stated above, the meshing of the ring gear 10, planet gears 40, and sun gear 30 at all times, and the counter-clockwise rotating of the sun gear 30, each planet gear 40 would be driven by the rear chain wheel 20 immediately, without delay when the bicycle is just started. Consequently, the forces applied to the pedals would be instantly transferred to the rear wheel 1 and ring gear 10 via the planet gears 40, the chain wheel 20 and the linking chain 6 for the fastest acceleration, without any loss of energy. It is known in the prior art that when starting to accelerate, there will be a time delay before acceleration of the pedals is transferred to bicycle wheels. Such not only causes waste of human energy but also delays the power transferring time and reduces the acceleration of the bicycle.

Meanwhile, because the bicycle is freely coasting, the ring gear 10, attached on the hub 2 of the rear wheel 1, still rotates clockwise, as mentioned above, so that when power is again applied to the pedals, the planet gears 40 and the ring gear 10 will not rotate relative to one another, and the ring gear 10 will drive the planet gears 40 by the existing rotating inertia. Therefore, the forces acting on the pedals, transferred to the front and rear chain wheels, with the aid of the ring gears inertia, can be directly transferred to the ring gear 10 and the rear wheel 1 with less resistance.

Therefore, the re-acceleration of the bicycle can save power when coasting and when actively being pedaled.

I claim:

1. A bicycle drive system comprising:

a chain;

at least one wheel having opposing sides and a wheel axle;

a hub secured to said wheel and rotatively mounted on said wheel axle, said hub having an external gear drive mounting section;

a ring gear located within said external gear drive mounting section and fixedly secured to the hub of the wheel for rotation therewith about the wheel axle;

a rear chain wheel rotatively mounted on said wheel axle located external to and adjacent said ring gear, said rear chain wheel being engaged with the chain to be rotatively driven responsive to displacement of said chain, said rear chain wheel having three radially and equidistantly spaced base axles extending from one side thereof;

a sun gear mounted on said wheel axle for rotation around said axle in a unidirectional displacement, said sun gear being disposed in concentric relationship with said ring gear;

a unidirectional bearing rotatively mounted on said axle coupling said rear chain wheel and said sun gear thereby providing said unidirectional displacement of said sun gear: and, three planet gears disposed between said ring gear and said sun gear, each of said three planet gears being rotatively coupled to a respective one of said three base axles and meshingly engaged with both said ring gear and said sun gear, said ring gear being driven by rotation of said planet gears relative to said sun gear responsive to displacement of the chain in a first rotative direction with said sun gear being locked against rotation by said unidirectional bearing, said planet gears acting as idlers responsive to rotation of the chain in a second rotative direction, said second rotative direction being opposite said first rotative direction.

* * * * *